United States Patent [19]

Suma

[11] Patent Number: 4,716,565

[45] Date of Patent: Dec. 29, 1987

[54] ERROR CONCEALING SYSTEM FOR DIGITAL DATA

[75] Inventor: Tetsuro Suma, Shinagawa, Japan

[73] Assignee: Sony Corporation, Tokyo, Japan

[21] Appl. No.: 826,497

[22] PCT Filed: Apr. 26, 1985

[86] PCT No.: PCT/JP85/00238

§ 371 Date: Dec. 27, 1985

§ 102(e) Date: Dec. 27, 1985

[87] PCT Pub. No.: WO85/05211

PCT Pub. Date: Nov. 21, 1985

[30] Foreign Application Priority Data

Apr. 27, 1984 [JP] Japan ................... 59-86755

[51] Int. Cl.$^4$ .................... H04N 5/21; G06F 11/00
[52] U.S. Cl. ...................... 371/31; 358/327; 358/339; 358/314; 360/38.1
[58] Field of Search ............. 371/31, 65; 358/327, 358/336, 339, 337, 314; 360/38.1, 36.2

[56] References Cited

U.S. PATENT DOCUMENTS

| | | | |
|---|---|---|---|
| 4,315,278 | 2/1982 | Pasdera | 358/327 X |
| 4,380,069 | 4/1983 | Reitmeier | 371/31 |
| 4,497,055 | 1/1985 | Hoshino | 371/31 |
| 4,517,600 | 5/1985 | Reitmeier | 371/31 X |

*Primary Examiner*—Jerry Smith
*Assistant Examiner*—Robert W. Beausoliel, Jr.
*Attorney, Agent, or Firm*—Lewis H. Eslinger

[57] ABSTRACT

The present invention relates to an error concealing system for digital data in which a reproduced data signal is supplied to error-concealing circuits (34) and (43) and an erroneous data in the reproduced data signal is concealed by the interpolation or substitution using a data near the erroneous data, wherein when the nearby data is erroneous, the nearby data is error-concealed and then fed back to the concealing circuits (34) and (43) to thereby carry out the error concealment so that the erroneous data can sequentially be concealed by using a correct data of small scale.

12 Claims, 14 Drawing Figures

ERROR CONCEALING SYSTEM FOR DIGITAL DATA

TECHNICAL FIELD

The present invention relates to an error concealing system for digital data for use with, for example, a digital VTR.

BACKGROUND ART

An example of a prior art digital VTR will hereinafter be described with reference to FIGS. 1 to 3. In the first place, an arrangement relationship of rotary magnetic heads of the prior art digital VTR will be described with reference to FIG. 1. Reference letter DR designates a tape guide drum which is constituted by a rotary drum as an upper drum and a fixed drum as a lower drum. This tape guide drum DR may be formed of a fixed drum as an upper and lower drum and a rotary drum as a middle drum. Reference letters $H_A$ to $H_D$ designate recording rotary magnetic drums and $H_A'$ to $H_D'$ designate reproducing rotary magnetic heads. Each of these rotary magnetic heads is mounted on the rotary drum of the tape guide drum DR with an arrangement relationship that will be described below. The recording rotary magnetic heads $H_A$, $H_B$ and $H_C$, $H_D$ are two pairs of recording rotary magnetic heads disposed with an angular spacing of 180°, while the reproducing rotary magnetic heads $H_A'$, $H_B'$ and $H_C'$, $H_D'$ are two pairs of reproducing rotary magnetic heads disposed with an angular spacing of 180°. The lines connecting these two pairs of reproducing rotary magnetic heads and two pairs of recording rotary magnetic heads are perpendicular to each other. The recording rotary magnetic heads $H_A$ and $H_B$ are adapted to record a digitized video signal so as to form magnetic tracks each having a different azimuth on a magnetic tape TP, while upon reproducing the reproducing rotary magnetic heads $H_A'$ and $H_B'$ are adapted to reproduce the recorded signals on the respective tracks. Similarly, the recording rotary magnetic heads $H_C$ and $H_D$ are adapted to record a digitized video signal so as to form magnetic tracks each having a different azimuth on the magnetic tape TP, while upon reproducing, the reproducing rotary magnetic heads $H_C'$ and $H_D'$ are adapted to reproduce the signals recorded on these tracks.

References $TG_1$ and $TG_2$ designate tape guide poles for determining a wrapping angle $\theta$ with which the magnetic tape TP is wound around the tape guide drum DR. The tape wrapping angle $\theta$ is selected to be, for example, 240°.

Now, a recording system of the prior art digital VTR will be described with reference to FIG. 2. Reference numeral 1 designates an A/D converter to which component color video signals, i.e., a luminance signal Y, a blue color difference signal B-Y and a red color difference signal R-Y are supplied and thereby A/D-converted to be digital component video signals. These digitized component video signals are supplied to a multiplexer 2, in which they are multiplexed and 2-channel encoded and thereby produced as 2-channel multiplexed digital video signals. These signals are supplied to a shuffle or interleaving circuit 3 provided with a memory and thereby shuffled. In this shuffle circuit 3, the 2-channel digital video signals are written in the memory by respective write clock pulses and then read out therefrom by respective read clock signals at a predetermined processing speed, whereby to shuffle the 2-channel digital video signals, thus preventing a burst error from occurring in a reproduced data due to the dropout of the tape and so on.

The 2-channel digital video signals derived from the shuffle circuit 3 are supplied to an error correcting and encoding circuit 4 in which they are encoded and then fed to a time base expanding circuit (FIFO memory) 5 and thereby time-base-expanded. In the time base expanding circuit 5, the 2-channel digital video signals from the error correcting and encoding circuit 4 are written in a memory by a write clock signal corresponding to the processing speed and then read out therefrom by a read clock signal corresponding to the recording rate.

The 2-channel digital video signals derived from the time base expanding circuit 5 are alternately supplied to recording amplifiers 6A, 6B and 6C, 6D at every 1/5 field (or at every 1/6 field). The respective outputs from the recording amplifiers 6A, 6B and 6C, 6D are respectively supplied to the recording rotary magnetic heads $H_A$, $H_B$ and $H_C$, $H_D$ and thereby recorded on the magnetic tape TP so as to form slant tracks.

A reproducing system of the prior art digital VTR will be described with reference to FIG. 3. The digital video signals reproduced from the magnetic tape TP by the reproducing rotary magnetic heads $H_A'$ to $H_D'$ are respectively supplied through playback amplifiers 7A, 7B, 7C and 7D to playback processors 8A, 8B, 8C and 8D each having a PLL and a bit synchronizing circuit. In these playback processors 8A to 8D, the reproduced digital video signals from the respective amplifiers 7A to 7D are supplied to the PLLs and thereby the clock signals are detected. By these clock signals, the respective digital video signals supplied to the bit synchronizing circuits are synchronized. Further, the playback processors 8A to 8D include extracting circuits for extracting block synchronizing signals from the synchronized digital video signals on the basis of the output signals from the bit synchronizing circuits and the PLLs.

The outputs from the playback processors 8A to 8D are supplied to a time base corrector 9 in which they are time-base-compressed. In this time base corrector 9, the outputs from the playback processors 8A to 8D are written in a memory by a write clock signal corresponding to a recording rate and then read out therefrom by a read clock signal corresponding to the processing speed to thereby time-base-compress the same. The time-base-compressed 2-channel digital video signals derived from the time base corrector 9 are supplied through a synchronizing detector circuit 10 to an address reproducing circuit 11. The 2-channel digital video signals derived from the address reproducing circuit 11 are supplied to an error correcting decoder 12 in which they are error-corrected and then supplied to and written in a frame memory 13.

The 2-channel digital video signals read out from the memory 13 are supplied to a de-shuffle de-interleave circuit 14. In the de-shuffle circuit 14, the 2-channel digital video signals from the memory 13 are written by a write clock signal based on the write processing speed and de-shuffled and read out therefrom by a read clock signal corresponding to a read processing speed, so that even if the burst error occurs in the reproduced signal due to a dropout or the like, there is a small possibility that errors will occur together on the picture.

The 2-channel digital video signals from the de-shuffle circuit 14 are supplied to a de-multiplexer 15 in which they are decoded to 3-channel digital component video signals. Thereafter, they are fed to an error concealing circuit 16 and thereby error-concealed. The 3-channel digital component video signals from the error concealing circucit 16 are supplied to a D/A converter 17 in which they are D/A-converted and thereby developed as analog component video signals, that is, the luminance signal Y, the blue color difference signal B-Y and the red color difference signal R-Y.

The method for error-concealing the digital video data in the prior art digital VTR will be described with reference to FIGS. 4 to 9.

FIG. 4 illustrates a desired picture element e on a desired scanning line $L_n$ on the video screen of a television receiver and 8 adjacent picture elements a to d and f to i on the same scanning line $L_n$ adjacent the desired picture element and on the upper and lower scanning lines $L_{n-1}$ and $L_{n+1}$. In this case, between two picture elements adjacent on the upper and lower scanning lines of the video screen, for example, picture elements a and d there is a time difference of one horizontal period (1H).

When the data corresponding to the picture element e must be error-concealed, the data is interpolated by one of the data of picture elements adjacent to the picture element e in the left and right hand sides (d, f), in the upper and lower sides (b, h), in the oblique directions (a, i; c, g), in the cross-form (b, d, f, h) and x-form (a, c, g, i) or is substituted with the data corresponding to any one of the ambient picture elements.

A prior art error concealing apparatus will be described with reference to FIG. 5. In FIG. 5, reference numeral 20 designates an overall arrangement of a delay memory. Since 9 picture elements of square lattice extending to, for example, three scanning lines shown in FIG. 4 are to be processed, the full delay time of the delay memory 20 is set as $2H+2T_S$ where $T_S$ is the delay time for one picture element (sample unit) and H is the horizontal period. Reference numerals 21 to 28 designate individual delay elements, respectively and reference numeral 29 designates an error concealing circuit. A digital video data signal applied to an input terminal IN was already error-corrected. If the error of this digital video signal is beyond the error correction ability, such digital video data signal accompanying with an error flag is supplied to the first unit delay memory 21 and also branched to and supplied to the error concealing circuit 29. The output from the first unit delay memory 21 is supplied to the second unit delay memory 22 and also branched to and supplied to the error concealing circuit 29. Reference numeral 23 designates a main delay memory and the delay time thereof is selected to be equal to a time difference $(1H-2T_S)$ between the picture element f on the right-hand side of one scanning line $L_n$ and the picture element g at the left-hand side of the succeeding scanning line of the square lattice shown in FIG. 4. The output from the second unit delay memory 22 is supplied to the main delay memory 23 and also branched to and fed to the error concealing circuit 29. The delay memories 24 to 26 have delay times the same as those of the above mentioned delay memories 21 to 23. The output from the first main memory 23 is sequentially supplied through the third and fourth unit delay memories 24 and 25 to the second main memory 26 and the outputs from the respective delay memories 24 to 26 are also branched to and then fed to the error concealing circuit 29. Reference numerals 27 and 28 designate fifth and sixth unit delay memories. The output from the second main delay memory 26 is sequentially supplied to both the unit delay memories 27 and 28 and the outputs from both the unit delay memories 27 and 28 are supplied to the error concealing circuit 29. The error concealing circuit 29 uses the respective digital video data derived from the delay memory 20 to carry out concealing processings, such as, determining the optimum interpolation direction and so on. The digital video data error-concealed therein is led out at an output terminal OUT. When the input digital video data does not require the error-concealment, the input digital video data is merely passed through the error concealing circuit 29 and then developed at the output terminal OUT as it is.

At the center of the delay memory 20, or the connection point between the third and fourth unit delay memories 24 and 25 or at time point $t_0$ in which a data ⓔ corresponding to the central picture element e of the square lattice shown in FIG. 4 exists, data at the input and output terminals of the delay memory 20 and at the respective branching points thereof become ⓘ to ⓐ corresponding to the respective picture elements i to a in the direction from the input terminal to the output terminal.

FIG. 6 illustrates patterns of the recording tracks formed on the magnetic tape TP by the afore mentioned digital VTR, in which A, B, C and D respectively designate slant tracks recorded by the recording rotary magnetic heads $H_A$, $H_B$, $H_C$ and $H_D$ which are sequentially suffixed as 0, 1, 2, ...

Reference A', B', C' and D' respectively designate tracing tracks in a case where the magnetic tape TP is transported at the constant and same speed as that of the recording mode and the respective tracks are traced by the corresponding reproducing rotary magnetic heads $H_A'$, $H_B'$, $H_C'$ and $H_D'$ to thereby reproduce the recorded signals. These references A', B', C' and D' are suffixed as 0, 1, 2, ... In this case, since these tracing tracks are substantially completely coincident with the recording tracks, the amplitudes of the envelopes of the respective reproduced high frequency signals are made substantially constant on the whole of each tracing track by the respective reproducing rotary magnetic heads $H_A'$ to $H_D'$.

Since as earlier noted the digital VTR carries out the shuffling operation upon recording, it is rare that errors will occur together on the video screen upon playback mode with constant tape speed. Accordingly, even if the error occurs in the data corresponding to the picture element e in FIG. 4, the data corresponding to the nearby picture elements a to d and f to i can be used for the error concealing processing in their original conditions.

However, when the magnetic tape TP similar to FIG. 6 is transported at high speed, for example, at a tape transport speed three times the transport speed of the recording mode, the patterns of the tracks $A_1'$, $B_1'$, $C_1'$, $D_1'$, $A_2'$, $B_2'$, ... traced by the reproducing rotary magnetic heads $H_A'$ to $H_D'$ become as shown in FIG. 7. Since the respective magnetic heads alternately intersect the recording tracks having different recording azimuths a large number of times, the envelope at every track of each reproduced high frequency signal by the reproducing rotary magnetic heads $H_A'$ to $H_D'$ becomes a waveform in which a lozenge is repeatedly formed as shown in FIG. 8. Since such reproduced high frequency signal can be used only in its portion (the hatched area in FIG. 8) where the amplitude thereof is higher than a predetermined value, the desired reproduced data can not be obtained. Accordingly, if an error occurs in a data near a data to be concealed a reproduced data can not be obtained and so on, so that the error concealment using the nearby data can not be made. In this case, the quality of the reproduced picture is deteriorated.

Although as shown in FIG. 9 it may be considered that the sampling range of the concealing data is enlarged, this urges the circuit scale to be increased considerably and is neither economical nor easily realizable. FIG. 9 illustrates a desired picture element e on a desired scanning line $L_n$ and 24 adjacent picture elements a to d, f to i and j to y on the same scanning line $L_n$ and upper and lower two of scanning lines $L_{n-2}$, $L_{n-1}$; $L_{n+1}$, $L_{n+2}$ of the video screen of the television receiver. In this case, however, let it be assumed that data corresponding to the picture elements a to i be erroneous and that data corresponding to the remaining picture elements is correct. By the interpolation or delay by using the data of the picture elements selected from the 24 picture elements, the data corresponding to the picture element e is error-concealed.

In view of such aspects, an object of this invention is to provide an error concealing system for digital data by which in a reproducing system having a relatively high error rate, the concealing processing can be carried out by using an error-concealing data of small scale.

DISCLOSURE OF INVENTION

In order to achieve the above mentioned object, the present invention is to provide an error concealing system for digital data in which a reproduced data signal is supplied to an error concealing circuit in which an erroneous data of the reproduced data signal is concealed by the interpolation or substitution using a data near the erroneous data, characterized in that when such nearby data has an error, the data is error-concealed by using the nearby data and then fed to a concealing circuit thus to carry out the error concealment.

BRIEF DESCRIPTION OF THE DRAWINGS

FIGS. 4, 9, 11 and 13 are diagrams useful for explaining the present invention, FIG. 10 is a block diagram showing an example of an error concealing apparatus to which the present invention is applied and FIG. 12 is a block diagram showing another example of the error concealing apparatus to which the present invention is applied.

BEST MODE FOR CARRYING OUT THE INVENTION

An embodiment of an error concealing system for digital data according to the present invention will hereinafter be described with reference to FIGS. 10 and 11.

Figure 1:
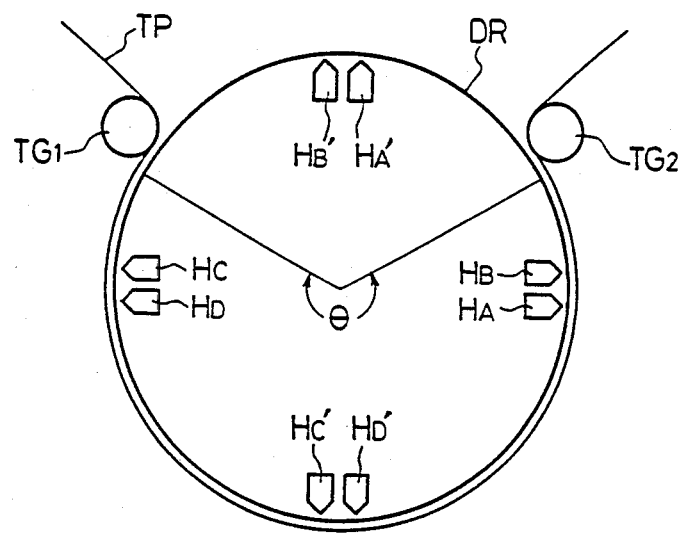
FIGS. 1, 2 and 3 are respectively a locational representation of a tape guide drum and rotary magnetic heads, a block diagram of a recording system and a block diagram of a reproducing system of an example of a digital VTR to which the present invention is applied with good effect.
Figure 2:
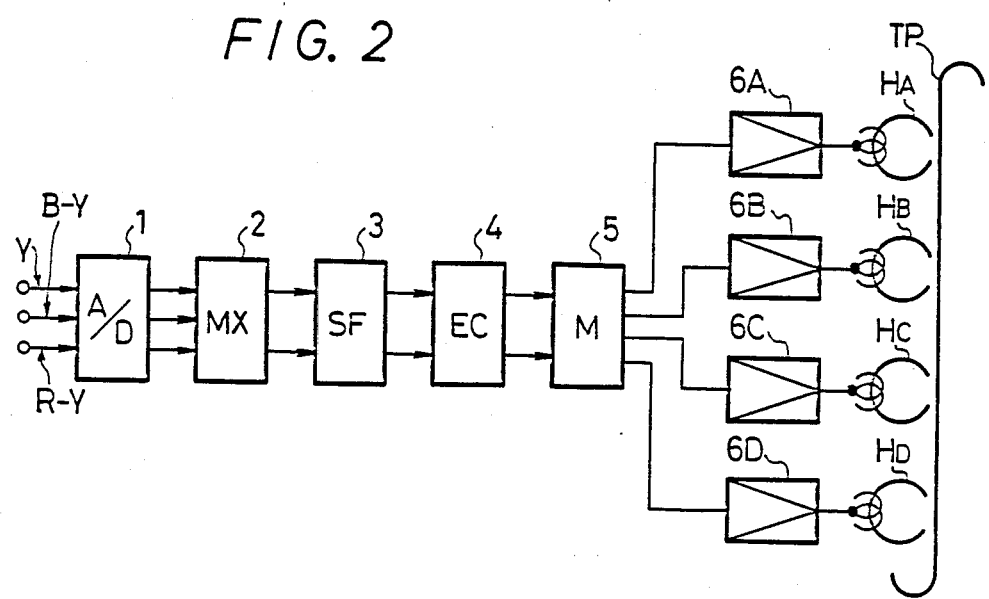
Figure 3:
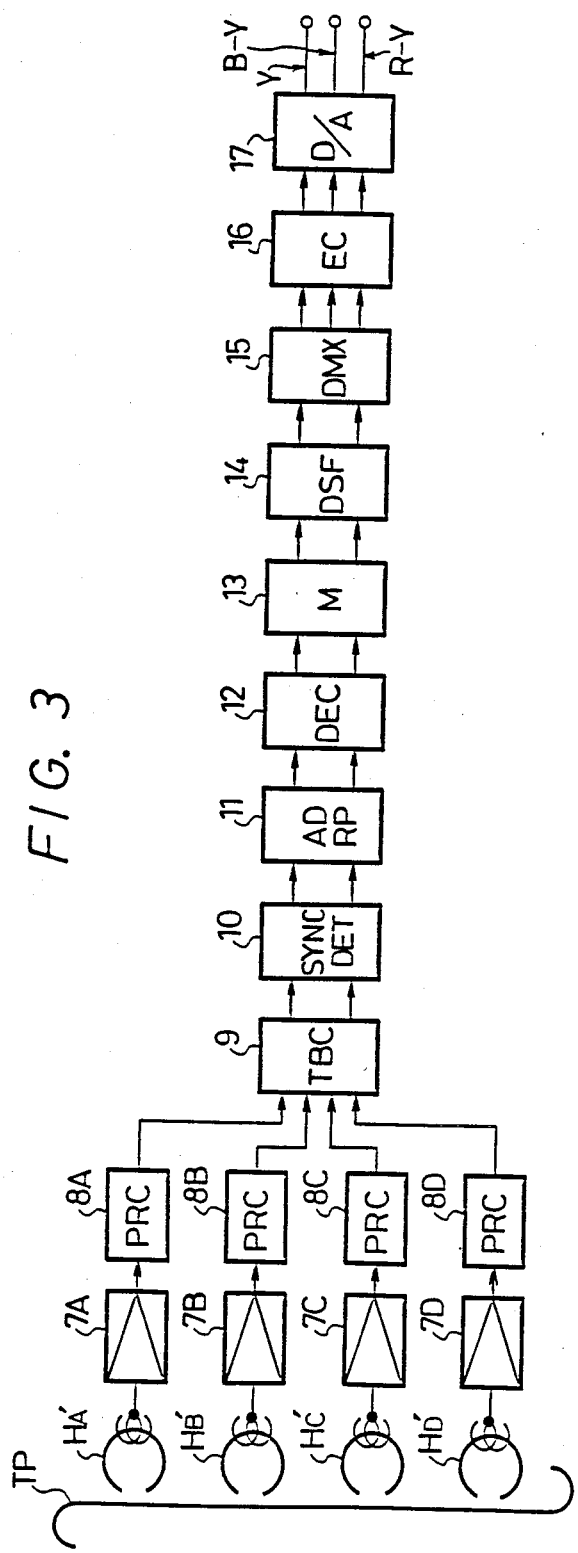
Figure 4:
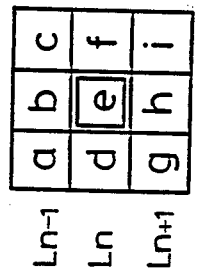
Figure 5:
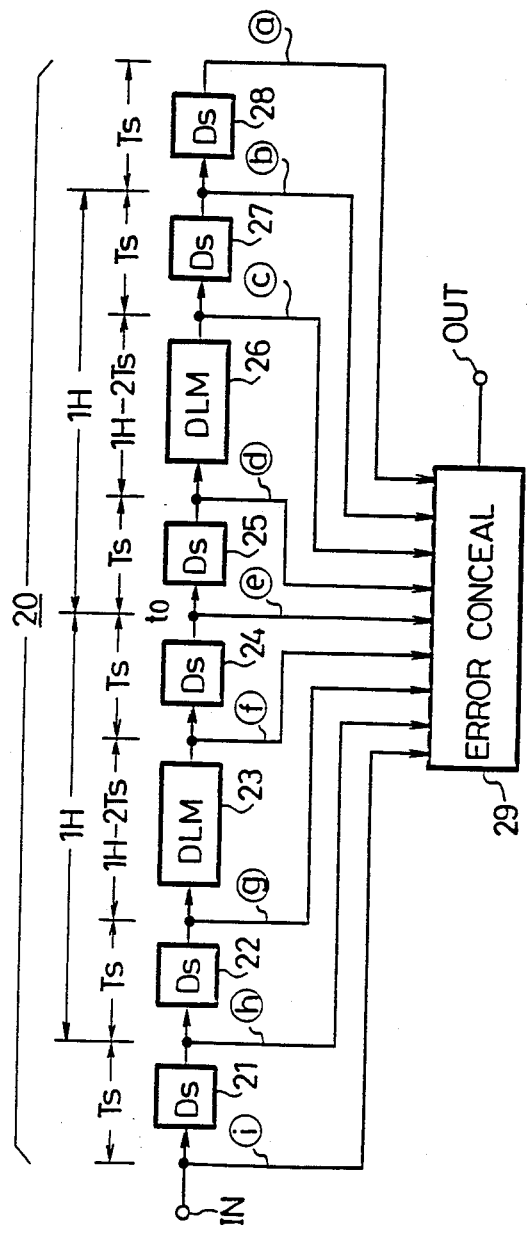
FIG. 5 is a block diagram showing a prior art error concealing circuit.
Figure 6:
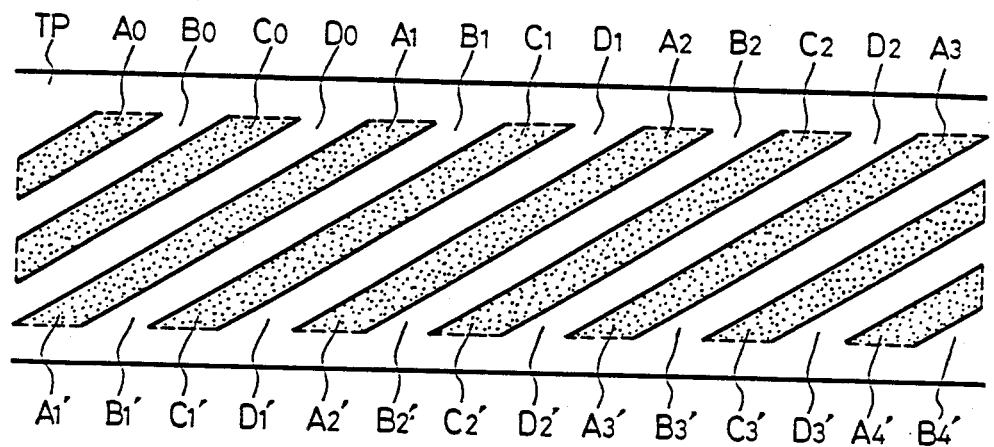
FIGS. 6 and 7 are respectively pattern diagrams showing track patterns of a magnetic tape.
Figure 7:
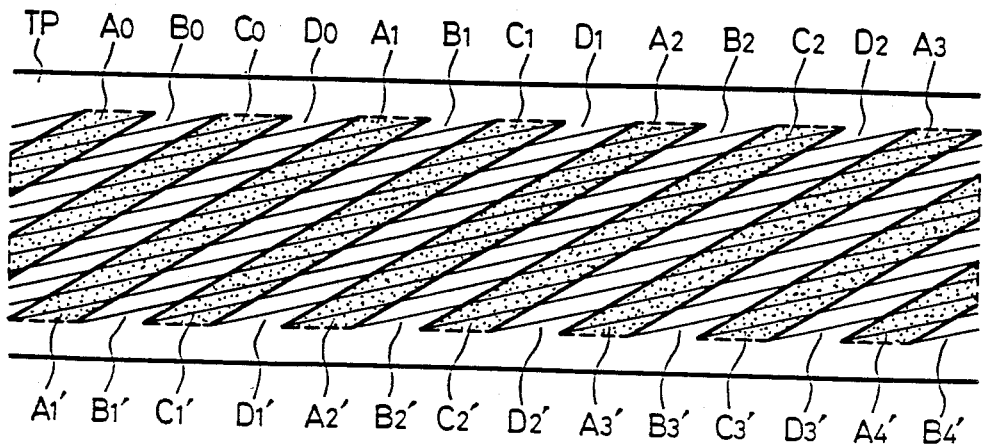
Figure 8:
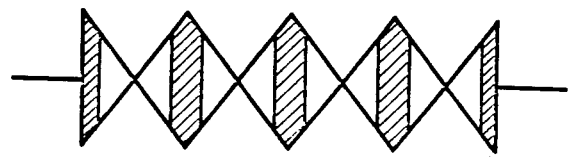
FIG. 8 is a waveform diagram showing an envelope of a reproduced high frequency signal.
Figures 9, 10:
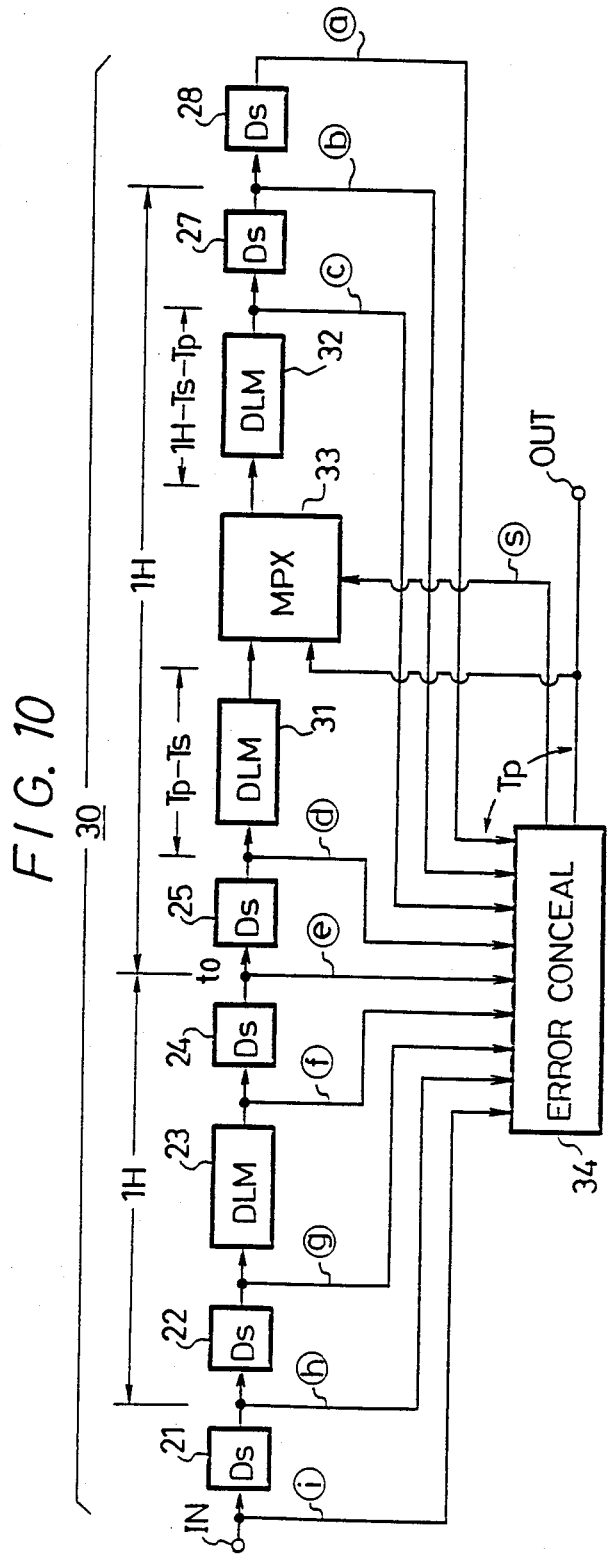

FIG. 10 shows an arrangement of an example of an error concealing apparatus to which the present invention is applied. In FIG. 10, like parts corresponding to those of FIG. 5 are marked with the same references and the overlapped explanation therefor will be omitted.

In FIG. 10, reference numeral 30 designates an overall arrangement of a delay memory. The total delay time of this delay memory 30 is determined as $2H+2T_S$ same as that of the delay memory 20 shown in FIG. 5. Reference numerals 31 and 32 respectively designate a compensation delay memory and a main delay memory. The compensation delay memory 31 is supplied with the output from the fourth unit delay memory 25 and the output from the main delay memory 32 is supplied to the fifth unit delay memory 27. A multiplexer 33 is interposed between the compensation delay memory 31 and the main delay memory 32. Reference numeral 34 designates an error concealing circuit and, the output and a control signal ⓢ from the error concealing circuit 34 are supplied to the multiplexer 33.

Since the error concealing circuit 34 has a delay time $T_P$ between its input and output, the delay time of the compensation delay memory 31 is selected to be $T_P-T_S$ and in correspondence therewith, the delay time of the main memory 32 is determined to be $1H-T_S-T_P$.

The operation of the error concealing apparatus of FIG. 10 is as follows.

Figures 11A, 11B, 13:
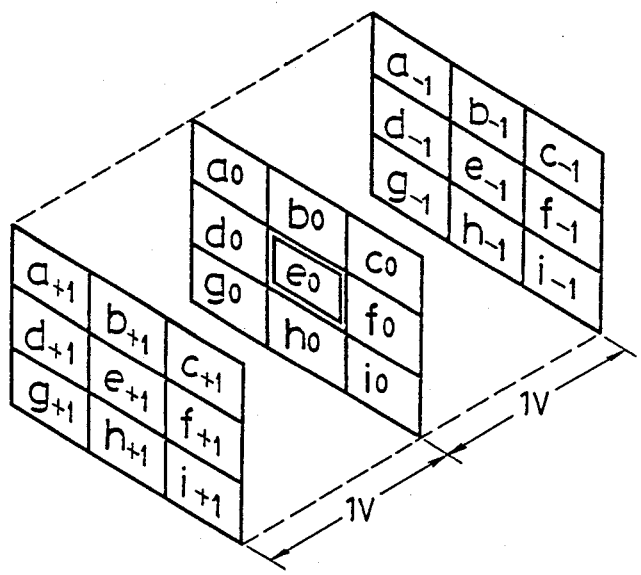

In a rectangular lattice shown in FIG. 11A, let it be assumed that data corresponding to the picture elements a to c on the scanning line $L_{n-1}$ are correct and that other data corresponding to the picture elements d to l on the other scanning lines $L_n$ to $L_{n+2}$ are all erroneous.

In this case, although in the prior art error concealing apparatus shown in FIG. 5 the data corresponding to the picture elements d to f on the scanning line $L_n$ can be concealed by using the correct data corresponding to the picture elements a to c on the scanning line $L_{n-1}$, the data corresponding to the picture element h on the scanning line $L_{n+1}$ can not be concealed because all the data surrounding such data are all erroneous.

However, in the error concealing apparatus shown in FIG. 10, since the main delay memory 32 is provided at its input side with the multiplexer 33, the erroneous data (ⓔ in the illustrated state) is error-concealed by the error concealing circuit 34 and, the error-concealed data and an error flag whose presentation is switched from "erroneous" to "correct" in response to such data concealment are supplied to the multiplexer 33. At that time, the multiplexer 33 is switched by the control signal ⓢ derived from the concealing circuit 34 such that it transmits the concealed data. As described above, the concealed data on the scanning line $L_n$ is fed back to the main delay memory 32 and both the unit delay memories 27 and 28. Then, the respective data in the delay memory 30 are moved from the illustrated state after one horizontal period to the state where the erroneous data ⓗ can be concealed since there are error-concealed data ⓓ', ⓔ', ⓕ', on the scanning line $L_n$ and erroneous data ⓖ to ① on the scanning lines $L_{n+1}$ and $L_{n+2}$ as shown in FIG. 11B.

As described above, in this error concealing apparatus, since the concealed data is fed back to the delay memory, the erroneous data can sequentially be concealed by using the correct data of small scale. Thus, even when the error rate is relatively high such as when the digital VTR is in the playback mode at a high speed, it is possible to carry out the error concealment with ease.

While in the above the playback mode at high tape speed is described, this is also true for the playback mode at low tape speed.

Another example of the error concealing apparatus to which the present invention is applied will be described with reference to FIGS. 12 and 13.

Figure 12:
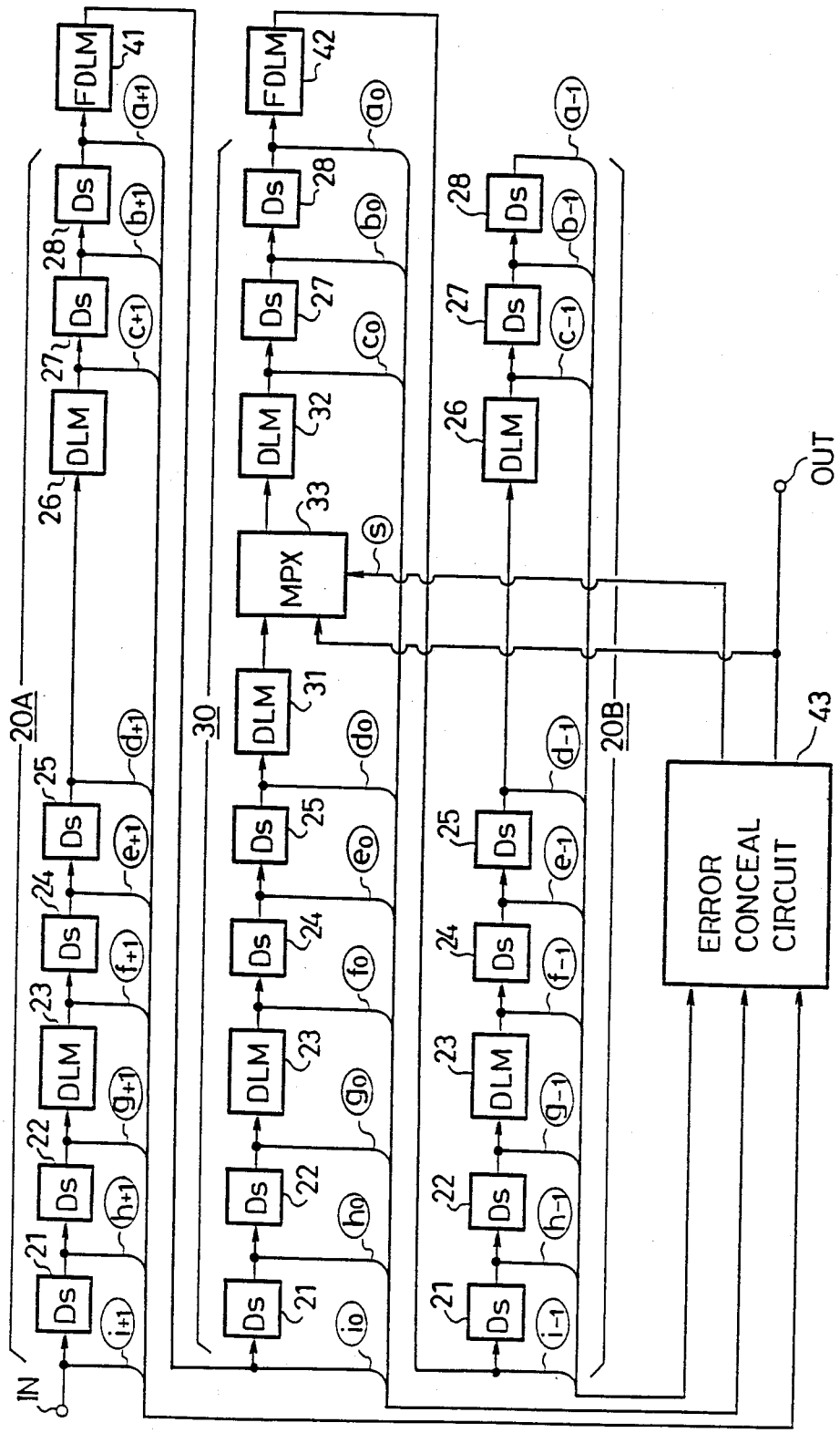

FIG. 12 shows an arrangement of another example of the error concealing apparatus. In FIG. 12, like parts corresponding to those of FIGS. 5 and 10 are marked with the same references and overlapped explanation will be omitted.

In FIG. 12, reference numerals 20A and 20B respectively designate rear field and front field line delay memories. Both the line delay memories 20A and 20B are exactly the same in arrangement as the delay memory 20 shown in FIG. 5. Reference numerals 41 and 42 designate field delay memories for the rear and main fields, respectively. The field delay memories 41 and 42 are both supplied with the outputs from the rear field and main field line delay memories 20A and 20B. The delay times of both the field delay memories 41 and 42 are selected to be both $(1V-2H+2T_S)$. The outputs therefrom are supplied to the main field and front field line delay memories 30 and 20B. Reference numeral 43 designates an error concealing circuit. To the error concealing circuit 43, there are supplied the branched outputs from the front field, rear field and main field line delay memories 20A, 20B and 30, that is, data $a_{+1}$ to $i_{+1}$ from the rear field, data $a_{-1}$ to $i_{-1}$ from the main field and data $a_{-1}$ to $i_{-1}$ from the front field. Further, from the error concealing circuit 43, the output and the control signal ⓢ thereof are supplied to the multiplexer 33 provided in the main field line delay memory 30, similarly to the embodiment of FIG. 10.

FIG. 13 shows a relationship amongst the data of the respective fields. From this, it will be apparent that the apparatus of FIG. 12 is used in such a case that the present invention is applied to three dimensions containing the time base. Accordingly, from the explanation given on the embodiment of FIG. 10, it can easily be understood that the data, which is concealed by using the correct data of the preceding field, is fed back to the delay memory and the erroneous data at the succeeding field can be sequentially concealed.

While in the apparatus of FIG. 12 the data of a certain field and the fields before and after such field, i.e., totally 3 fields are used for error concealment, instead of 3-field data, 3-frame data can be used.

According to the present invention as described above in detail, since the concealed data is fed back to the delay memory and is used as the correct data for the error concealment, the erroneous data can sequentially be concealed by the correct data of small scale. Consequently, when the present invention is applied to the digital VTR, even upon playback mode at variable tape speeds, it is possible to improve the quality of the picture by using the circuit arrangement of a small scale.

What is claimed is:

1. Error concealing method for digital data in which a reproduced data signal comprised of a plurality of data elements arranged in a matrix is supplied to an error concealing circuit and an erroneous data element in said reproduced data signal is error-concealed by interpolation based on data nearby said erroneous data element in said matrix, characterized by the steps of determining when said nearby data is erroneous, concealing the errors in said erroneous nearby data and then feeding back said error-concealed nearby data to said error concealing circuit to thereby carry out error-concealment of said erroneous data element using said error-concealed nearby data.

2. A method of concealing errors in a digital data signal, in which errors in erroneous data are concealed by small-scale interpolation, the method for use when the number of errors in the erroneous data is too great for small-size interpolation, comprising the steps of:
   determining the presence and location of erroneous data in the data signal;
   concealing errors in erroneous data by small-scale interpolation using correct data proximate said erroneous data;
   identifying subsequent erroneous data that is proximate erroneous data so as to preclude error concealment by small-scale interpolation;
   feeding back error-concealed erroneous data previously determined to be erroneous and previously error concealed using small-scale interpolation; and
   using the fed-back, error-concealed data to conceal errors in said subsequent erroneous data.

3. The method according to claim 2, in which said step of determining the presence and location of erroneous data includes the step of setting an error flag to indicate the presence of an error.

4. The method according to claim 3, in which the step of feeding back previously error-concealed data includes the further step of resetting said error flag.

5. The method according to claim 2, in which said digital data signal represents a video field and said data is formed as a matrix of picture elements making up said video field.

6. The method according to claim 2, in which said digital data signal represents a video signal and said data is formed as successive fields of said video signal.

7. The method according to claim 2, in which said digital data signal represents a video signal and said data is formed as a successive frames of said video signal.

8. Apparatus for concealing errors in a digital data signal, in which errors in erroneous data are concealed by small-scale interpolation, the apparatus for use when the errors are too numerous for small-scale interpolation, comprising:
   means for determining the presence and location of erroneous data in the data signal;
   means for concealing errors in erroneous data by small-scale interpolation using correct data proximate said erroneous data;
   means for identifying subsequent erroneous data that is proximate erroneous data so as to preclude error concealment by small-scale interpolation;
   means for feeding back error-concealed data that was previously error-concealed using small-scale interpolation; and
   means for using the fed-back, error-concealed data to conceal errors in said subsequent erroneous data.

9. The apparatus of claim 8, in which said means for feeding back previously error-concealed data includes a multiplex unit being controlled by said means for concealing errors to substitute the error-concealed data for the erroneous data.

10. Apparatus according to claim 8, in which said means for concealing errors includes a compensation delay memory for delaying erroneous data.

11. Apparatus according to claim 10, in which said compensation delay memory provides a time delay to data based upon a time delay provided by said means for concealing errors less the time delay involved in scanning the data.

12. Apparatus according to claim 10, further comprising a main delay memory receiving an output from said multiplex unit.

* * * * *

UNITED STATES PATENT AND TRADEMARK OFFICE
CERTIFICATE OF CORRECTION

PATENT NO. : 4,716,565
DATED : December 29, 1987
INVENTOR(S) : Tetsuro Suma

It is certified that error appears in the above-identified patent and that said Letters Patent is hereby corrected as shown below:

Column 3, line 7, change "circucit" to --circuit--.

Column 6, line 50, delete "all";

line 60, change " 5 " to -- S --.

IN CLAIMS.

Column 8, line 50, delete "a".

Signed and Sealed this

Fifteenth Day of November, 1988

Attest:

DONALD J. QUIGG

*Attesting Officer*      *Commissioner of Patents and Trademarks*